United States Patent [19]

Goto

[11] 4,367,040

[45] Jan. 4, 1983

[54] MULTI-CHANNEL OPTICAL SENSING SYSTEM

[75] Inventor: Kenya Goto, Yokohama, Japan

[73] Assignee: Tokyo Shibaura Denki Kabushiki Kaisha, Kawasaki, Japan

[21] Appl. No.: 152,163

[22] Filed: May 22, 1980

[30] Foreign Application Priority Data

May 29, 1979 [JP] Japan .................................. 54/66390
Jul. 25, 1979 [JP] Japan .................................. 54/94700

[51] Int. Cl.³ .............................................. G01J 5/48
[52] U.S. Cl. .................................. 356/44; 250/231 R; 250/231 P; 350/96.10
[58] Field of Search .......... 356/44; 250/231 R, 231 P, 250/227, 225; 332/68; 350/96.10, 96.29; 455/600

[56] References Cited

U.S. PATENT DOCUMENTS

| 2,385,086 | 9/1945 | D'Agostino et al. | 179/171.5 |
| 4,140,393 | 2/1979 | Cetas | 356/43 |
| 4,203,326 | 5/1980 | Gottlieb et al. | 73/339 R |
| 4,223,216 | 9/1980 | Quick et al. | 250/226 |
| 4,281,245 | 7/1981 | Brogardh et al. | 250/227 |
| 4,296,318 | 10/1981 | Mezzetti et al. | 250/225 |

FOREIGN PATENT DOCUMENTS

| 2551527 | 5/1976 | Fed. Rep. of Germany . |
| 2552507 | 5/1977 | Fed. Rep. of Germany . |
| 2719937 | 11/1978 | Fed. Rep. of Germany . |
| 2745770 | 4/1979 | Fed. Rep. of Germany . |

Primary Examiner—John D. Lee
Assistant Examiner—Frank Gonzalez
Attorney, Agent, or Firm—Oblon, Fisher, Spivak, McClelland & Maier

[57] ABSTRACT

A multi-channel optical sensing system for measuring temperature at a number of measuring points includes optical sensors, each of which modulates the incident light beam by light intensity modulation according to the temperature at each measuring point and returns the modulated light beam back to the same optical path. The individual optical sensors are coupled to optical fibers which transmit respective light beams of different wavelengths. These optical fibers are coupled to a wavelength multiplexer/demultiplexer unit, which receives modulated light beams and supplies non-modulated light beams. This unit spectroscopically multiplexes the modulated light beams and spectroscopically demultiplexes the non-modulated light beams. It is optically coupled to another spacially spaced-apart wavelength multiplexer/demultiplexer via an optical system for transmitting light. This other wavelength multiplexer/demultiplexer unit spectroscopically demultiplexes the modulated multiplexed light beam into component light beams supplied to respective other optical fibers and also spectroscopically multiplexes light beams of different wavelengths supplied from the respective other optical fibers. To each of these other optical fibers are coupled a light source unit and modulated light and non-modulated light detecting units.

8 Claims, 7 Drawing Figures

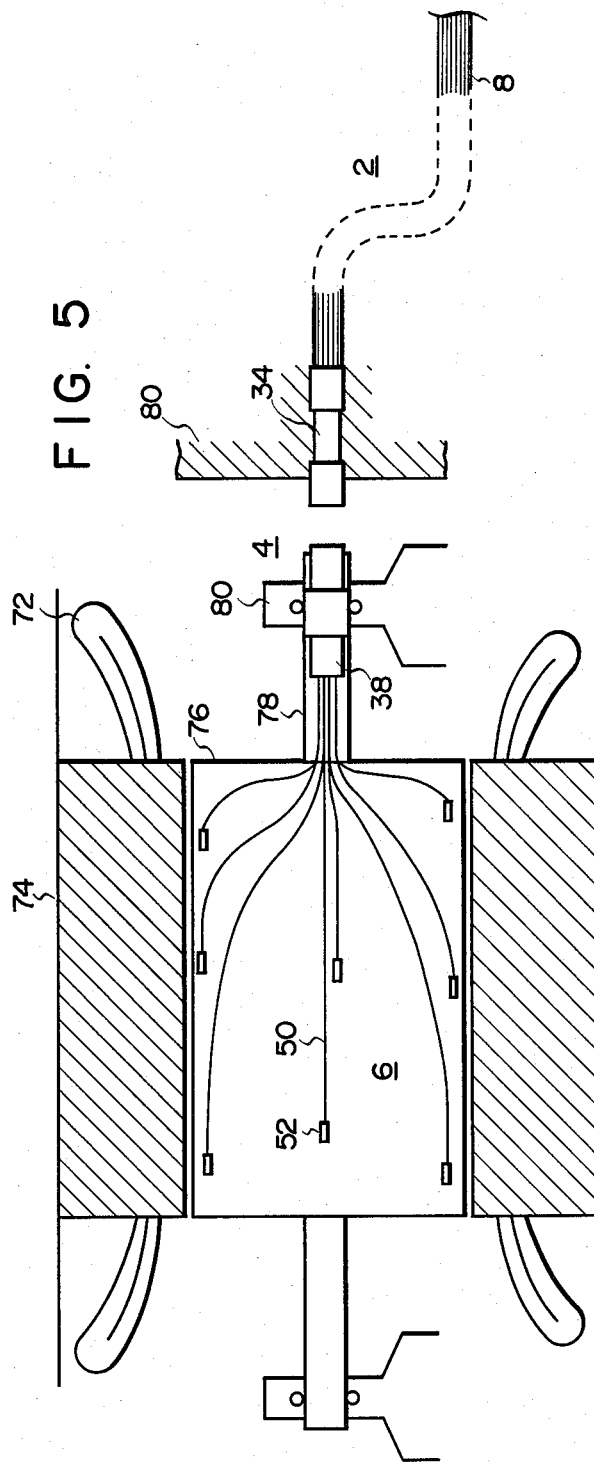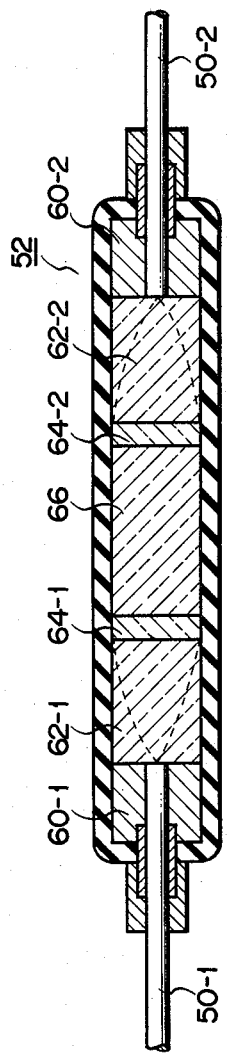
FIG. 5
FIG. 6

MULTI-CHANNEL OPTICAL SENSING SYSTEM

BACKGROUND OF THE INVENTION

1. Field of the Invention

This invention relates to optical sensing systems for measuring physical quantities and, more particularly, to a multi-channel optical sensing system for optically measuring physical quantities such as temperature and strain at a plurality of locations within a motor or a generator.

2. Description of the Prior Art

As the system for measuring a physical quantity, electrical sensing systems are well known and have been generally used. In such a system, a physical quantity to be measured is converted by a sensing element, which is provided at a measuring point and senses the physical quantity, into a corresponding electric signal which is transferred through a signal line to a measuring unit for analyzing the physical quantity. For example, in a system for measuring the temperature of the rotor of a generator during the operation thereof, thermistors, as temperature-sensing elements, are burried in the rotor at certain measuring points thereof, and signal lines which are electrically connected to the respective thermistors are led to and electrically connected to a slip ring, which is provided on the rotor, and through which detected signals from the sensors are supplied to a measuring unit provided at a location remote from the generator. These systems, however, have some problems. For example, since the detected signal is transferred through the slip ring, the transfer of the signal is unreliable. Also, since mechanical contacts are involved in the transfer of the signal, the service life is limited, and unreliable. Further, where thermistors are assembled within a generator, a signal having a high S/N ratio cannot be obtained due to the influence of strong electric fields and magnetic fields within the generator in which the thermistors is disposed. Furthermore, dielectric breakdown is likely to be caused by the strong electric fields.

There are also optical sensing systems for measuring the temperature. For example, a system using an infrared radiation thermometer detector for measuring the temperature of an apparatus such as a generator by detecting infrared rays emitted from the apparatus is well known in the art. With this system, in which the infrared detector and generator need not be electrically or mechanically coupled together, it is possible to solve the afore-mentioned problems. However, in case of a generator, in which the gap between the rotor and stator is small, typically 1 to 2 mm, difficulties are encountered in the measurement of infrared rays leaking from such a narrow gap at some measuring points in the rotor, particularly in the inner area in the generator, thus imposing restrictions upon the accuracy of the measurement.

SUMMARY OF THE INVENTION

An object of the invention is to provide an optical sensing system, which can accurately and reliably measure a physical quantity such as temperature at a plurality of measuring points within an apparatus such as a generator or a motor.

According to this invention, there is provided an optical sensing system having a series of n first optical waveguides for transmitting respective unmodulated light beams having different wavelengths, n corresponding to the number of measuring points.

A multiplexer for spectroscopically multiplexes the unmodulated light beams having different wavelengths and transmits them through the optical waveguides and transfers the spectroscopically multiplexed nonmodulated light beam through space.

A first demultiplexer spectroscopically demultiplexes the beam into unmodulated light beams having different wavelengths. Then a series of n second optical waveguides transmits the respective demultiplexed nonmodulated light beams having different wavelengths. The transmitted light beams are then light intensity modulated according to the physical quantity at the measuring points, with the modulation being provided at the respective measuring points and optically coupled to the respective second optical waveguide. A plurality of n third optical waveguides, optically coupled to the respective light intensity modulating means, transmits the light intensity modulated light beams and a second multiplexer spectroscopically multiplexes the modulated light beams having different wavelengths, and transmits them through the third optical waveguide.

A second means for transfers the spectroscopically multiplexed modulated light beam through space and a second demultiplexer spectroscopically demultiplexing the transmitted light beam into modulated light beams once again having different wavelengths. A series of n fourth optical waveguides transmit the spectroscopically demultiplexed light beams; and the physical quantity at each the measuring point is detected by comparing the light intensity of the unmodulated light beam transmitted through each of the first optical waveguides and that of the modulated light beam transmitted through the corresponding fourth optical waveguides.

BRIEF DESCRIPTION OF THE DRAWINGS

FIG. 5 is a schematic sectional view showing a generator incorporation the multi-channel optical sensing system shown in FIG. 1;

FIG. 6 is a schematic sectional view showing a different example of the optical sensor.

DETAILED DESCRIPTION OF THE PREFERRED EMBODIMENT

Figure 1:
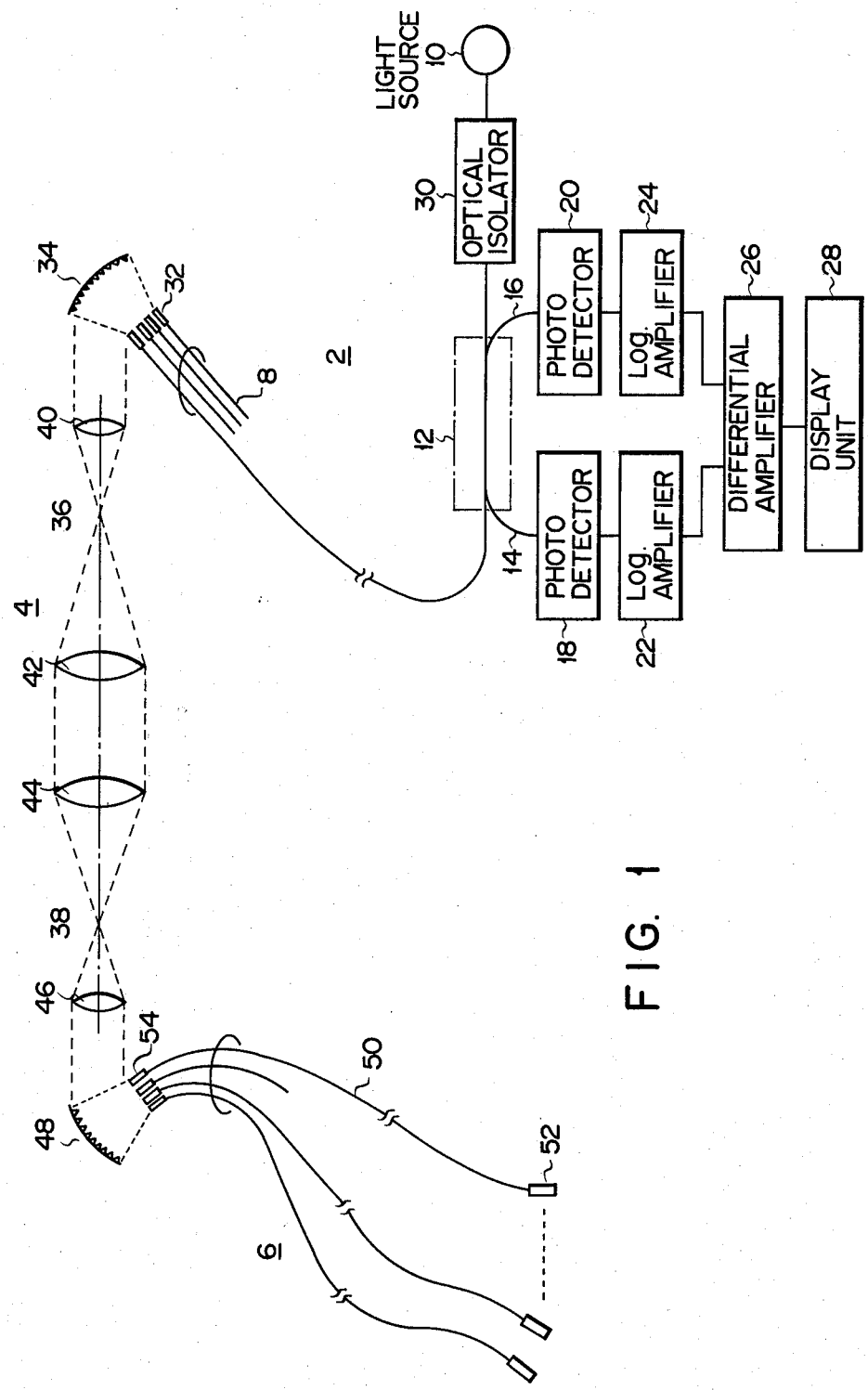
FIG. 1 is a schematic representation of an embodiment of the multi-channel optical sensing system according to the invention.

FIG. 1 shows an embodiment of the multi-channel optical sensing system according to the invention. In this system the optical input and output signals are transmitted through the same optical path.

This system can be thought to consist of three sections 2, 4 and 6. The first section 2 includes a number of, i.e., n(n=1, 2, 3, . . . ), optical fibers 8. These optical fibers 8 are each optically coupled at one end thereof to a light source unit 10, for instance a laser diode for wavelength multiplex communication or a light-emitting diode. These light source units 10 produce light beams each having a different and substantially single wavelength, i.e., a comparatively narrow wavelength range; that is, each light source unit supplies a light beam of a particular wavelength as input optical signal to each optical fiber. Each of the optical fiber 8 is coupled to an optical distributor 12 having a supply light path 14 and a return light path 16 which are coupled with light detecting units 18 and 20 respectively. The light detecting units 18 and 20 are electrically connected to respective logarithmic amplifiers 22 and 24, and both electric signals therefrom are supplied to a differential amplifier 26. In the differential amplifier 26, the both electric signals are compared to obtain the attenuation of the output optical signal, and from this value the temperature at each measuring point is determined. The measurement signal from the differential amplifier 26 is supplied to, for instance, a display unit 28, on which the temperature at each measuring point is displayed. In case where the measurement zone is controlled according to the temperature at the measuring point, the output signal from the differential amplifier 26 is supplied to a control system for controlling the measurement zone. In order to prevent the optical output signal returning from the optical distributor 12 from entering the light source unit 10 again, an optical isolator 30 including a faraday rotator is optically coupled between the optical distributor 12 and light source unit 10. The optical fibers 8 are bundled at their respective other ends, at each of which a rod lens 32 for diverging the input light beam received from each optical fiber 8 and converging the output light beam returning to each optical fiber 8 is provided.

These rod lenses 32 have their light beam traveling faces directed toward a first wavelength multiplexer/demultiplexer unit 34 in the second section 4. The unit 34 is for instance, a concave diffraction grating as is illustrated. It multiplexes the input light beams having different wavelengths and projected from the rod lenses 32 to produce an input compound light beam, and also it spectroscopically demultiplexes a returning output compound light beam into component output light beams having different wavelengths, which are distributed to the corresponding rod lenses 32. The concave diffraction grating of the unit 34 is not to be taken as limiting, and it is possible to adopt an another spectroscope, for example, a spherical diffraction grating and a prism. Along the compound light path directed to and from the first wavelength multiplexer/demultiplexer unit 34, first and second light transmission lens systems 36 and 38 are provided. The first lens system 36, as shown in FIG. 1, consists of, for instance, a lens element 40, which converts a converged output compound light beam returning toward the unit 34 into a parallel light beam and converges the input compound light beam from the unit 34, and a lens element 42, which converts the converged input compound light beam into a parallel light beam traveling to the second lens system 38 and converges a parallel output compound light beam traveling from the second lens system 38. The second lens system 38 is converse in function to the first lens system. It consists of similar lens elements 44 and 46 disposed along the compound light path. On the compound light path, a second wavelength multiplexer/demultiplexer 48 similar to the first one 34 is provided.

The third section 6 is provided in the measurement zone, and it has a similar arrangement to that of the first section 2. It includes n optical fibers 50, corresponding in number to the number of the measuring points in the measurement zone. Each optical fiber 50 is coupled at one end of an optical sensor 52, which modulates the light intensity of the input light beam transmitted through the optical fiber 50, and returns the modulated output light beam to the same optical path. The optical fibers 50 are bundled at their other ends, which are coupled to respective rod lenses 54 similar to the rod lenses 32 in the first section 2, these rod lenses 54 having their respective light traveling faces directed toward the second wavelength multiplexer/demultiplexer unit 48. The unit 48 spectroscopically demultiplexes the input compound light beam incident on it into the different wavelength component light beams distributed to the respectively corresponding optical fibers 50, and also it multiplexes different wavelength component light beams projected from the respective rod lenses 54 to produce the output compound light beam transmitted to the second lens system 38.

Figure 2:
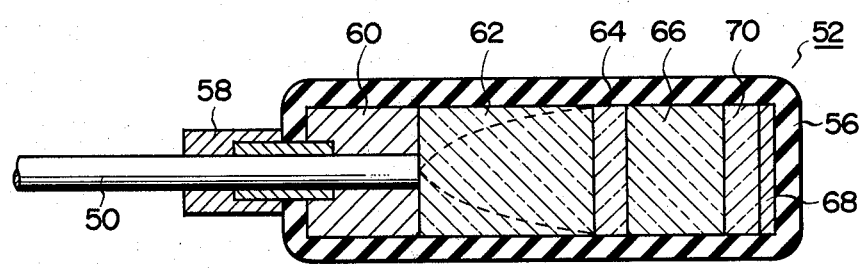
FIG. 2 is a schematic sectional view showing an example of the optical sensor shown in FIG. 1.
Figure 3:
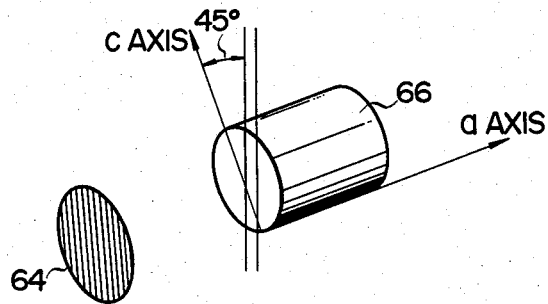
FIG. 3 is a schematic view showing the crystallographic axes of a double refraction crystal shown in FIG. 2.

FIG. 2 shows an example of the optical sensor 52, which returns the incident light beam back to the same light path after light intensity modulation according to the temperature of the measuring point. As shown in FIG. 2, the optical fiber 50 is reliably mounted by members 58 and 60 in a hollow cylindrical housing 56, for instance with an outer diameter of 1 mm and a length of 8mm, having a comparatively high thermal conductivity. In this optical sensor, a self-focusing rod lens 62, for instance a so-called "¼-pitch Selfoc Micro LENS" sold by Nippon Sheet Glass Co., Ltd. is provided in close contact with the end face of the optical fiber 50. This self-focusing rod lens 62 has a character of converting a light beam incident on its one end face, which is in close contact with the optical fiber, into a parallel light beam at the other end face. The other end face of the self-focusing rod lens 62 is in close contact with a polarizer 64, which is in turn in close contact with one end face of a double refraction crystal 66, for instance a LiNbO$_3$ or KPD single crystal. In case where the double refraction crystal 66 is a LiNbO$_3$ single crystal, as shown in FIG. 3, its a-axis is made to coincide with the light travelling direction, and its c-axis made to define an angle of 45° with respect to the polarization surface of the polarizer 64. Between the double refraction crystal 66 and a reflecting surface 68 of an Al or Au deposition film which is formed on the inner end surface of the housing 56, a quarter-wave plate 70 for compensating for a phase difference resulting from the reflection of light rays is interposed.

Figure 4:
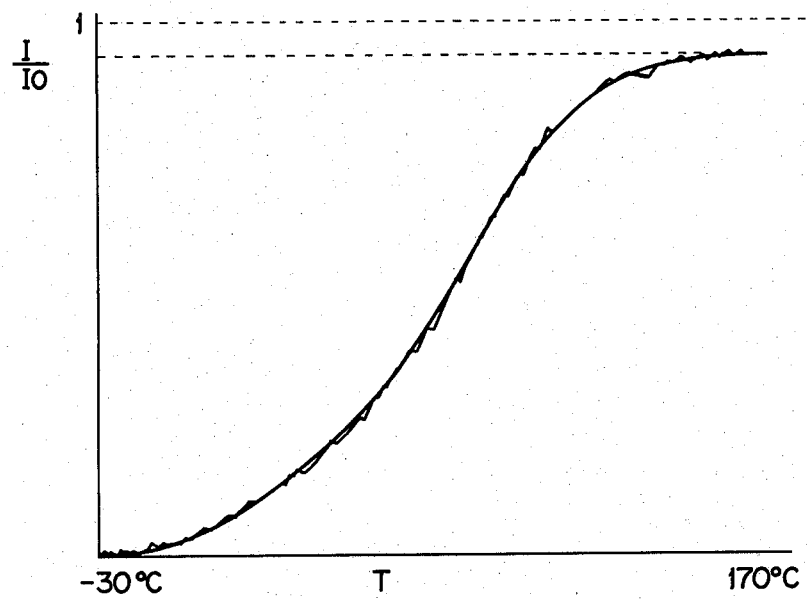
FIG. 4 is a graph showing a characteristic of the optical sensor shown in FIG. 1.

In the optical sensor 52 of the above construction, the input light beam projected from the one end face of the optical fiber 50 is diverged by the rod lens 62 into a parallel light beam to be incident on the polarizer 64, and a linearly polarized light beam emerging from the polarizer 64 is incident on the double refraction crystal 66. The light beam incident on the crystal 66 is separated into extraordinary rays and ordinary rays as it proceeds through the crystal 66, so that the retardation is produced between these two different rays emerging from the crystal 66. These rays are reflected by the reflecting surface 68 and them proceeds back through the quarter-wave plate 70 and double refraction crystal 66 again. Thus, until the reflected light beam reaches the polarizer 64 again, it is elliptically polarized. In consequence, a component of the light beam traveling along the polarization surface of the polarizer 64 is incident as the output signal on the rod lens 62. The double refraction B provided by the double refraction crystal 66 varies with temperature T, so that according to the temperature the light intensity I of the output light beam varies with respect to a constant light intensity $I_0$ of the input light beam incident on the optical sensor 52. The ratio $I/I_0$ between the two light intensities is given as $$(I/I_0) = \sin^2 \Phi$$

$$\Phi = (2\pi l_o/\lambda) \{B_o + (\alpha_o\beta_o + dB/dT)T + \alpha_o(dB/dT)T^2\}$$

and $$B = B_o\{1 + (dB/dT)T\} = (n_o - n_e)$$

where $\Phi$ is the retardation between the ordinary ray and extraordinary ray, $l_o$ is the length of the double refraction crystal at a temperature of 0° C., $\lambda$ is the wavelength of the incident light beam, $B_o$ is the double refraction of the crystal at a temperate of 0° C., $n_o$ is the refractive index of the ordinary ray and $n_e$ is the refractive index of the extraordinary ray. The above mentioned equation have been disclosed in Japanese patent publication 17869/50 published in June 24, 1975. For the further detail reference is invited to the Japanese patent publication. The graph of FIG. 4 shows the relation between the ratio $I/I_0$ and temperature. This graph represents measurement data obtained with a KDP crystal z-cut plate with a thickness of 20μ.

It will be understood from the above equation and graph of FIG. 4 that the optical sensor 52 modulates the light intensity of the incident light beam according to the temperature. The characteristic of the sensor 52 is influenced by the ambient electromagnetic field. Accordingly, the housing 56 is preferably made of an electromagnetic shielding material for shielding the double refraction crystal 66 from the electromagnetic field.

The multi-channel optical sensing system described above may be assembled in a generator as shown in FIG. 5. In the example of FIG. 5, the optical sensors 52 are burried in a rotor 76, which is rotated within a stator 74 provided with a number of coil elements 72. The optical fibers 50 in the third section 6 are led from the respective sensors 52 through the rotor 76, and their other ends are bundled within a shaft 78 of the rotor 76 supported in a bearing 80. Within the shaft 78, the second lens system 38 of the second section 4 is also accommodated such that its optical axis is aligned to the axis of rotation of the shaft 78. The first lens system 34 of the second section 4 is provided within a station 80, which faces and is spaced apart from the corresponding end of the shaft 78. The optical axis of the first lens system 34 is aligned to that of the second lens system 38. The first section 2 is provided in the station 80. In FIG. 5, the light source units 10 and other component parts of the first section 2 are omitted for simplifying the illustration.

The operation of the multi-channel optical sensing system assembled in the generator in the above way will now be described. It is assumed that one of the light source units 10 produces an infrared light beam. This light beam is partly distributed by the corresponding optical distributor 12 and supplied to the supply light path 14 coupled thereto. The rest of the light beam is transmitted through the optical isolator 30, optical distributor 12 and optical fiber 8 to reach and be diverged by the rod lens 32 and projected therefrom onto the first concave diffraction grating 34 in the second section 4. Onto this first concave diffraction grating the light beams having the other wavelengths than the infrared wavelength are also projected from the other rod lenses 32, and the grating 34 multiplexes the light beams of the different wavelengths to produce a compound light beam covering a broad wavelength range, which is projected onto the lens 40 of the first lens system 36. The light beam incident on the lens 40 is converged thereby, and then it is incident on the lens 42 for conversion into a parallel light beam travelling toward the lens 44 of the second lens system 38. The light beam incident on the lens 44 is converged thereby, and it is again converted by the lens 46 into a parallel light beam which is projected onto the second concave diffraction grating 48. The grating 48 spectroscopically demultiplexes the projected compound light into the component light beams having different wavelengths, which are respectively directed to be incident on the corresponding rod lenses 54. The infrared wavelength light beam is at this time transmitted through the corresponding rod lens 54 to the associated optical fiber 50 and reaches the optical sensor 52 coupled thereto. The light beam incident on the sensor 52 is light-intensity modulated therein, and the resultant modulated light beam returns through the same light path, i.e., through the optical fiber 50 and rod lens 54, and is projected again onto the grating 48, in which it is multiplexed with the other returning light beams. The output compound light beam thus obtained proceeds to reach and be spectroscopically demultiplexed again by the grating 34, and the resultant individual component return light beams are transmitted through the same light paths as for their respective corresponding input light beams; the infrared return light beam, for instance, is transmitted through the light path leading to the light source 10 producing the infrared input light beam. Each return light beam is partly supplied to the corresponding return light path 16, and the rest is led to the corresponding isolator 30, which prevents the incident light beam from travelling toward the associated light source unit 10. The light beams supplied to the supply and return light paths 14 and 16 are detected by the associated optical detectors 18 and 20 and converted into corresponding electric signals, which are supplied to the logarithmic amplifiers 22 and 24. The output signals from the logarithmic amplifiers 22 and 24 are coupled to the differential amplifier 26, and the temperature at the measuring point is determined from the ratio between the input and output optical signals and displayed on the display unit 28.

In the above mentioned manner, with the multi-channel optical sensing system for measuring temperature the temperature information at the individual measurement points of the rotor in the generator can be taken out to the outside of the generator as a signal light beam, which is obtained through optical coupling free from electric or mechanical contacts. Since in this system the detection of the temperature can be made entirely optically and the temperature information thus obtained is transmitted in the form of light information, particularly in the form of signal transfer free from electric or mechanical contacts on the inside and outside of rotating parts, so that a high reliability can be ensured. In addition, the temperature at each measuring point can be detected with a high signal-to-noise ratio and without being influenced by the strong electromagnetic field inside the generator, and the system is free from the problem of the dielectric breakdown. Further, the measurement of the temperature distribution in inner area in the generator, which has hitherto been difficult, can be obtained with a high precision by using the novel temperature-sensing optical sensors, wavelength multiplexing the light information and transmitting the compound output through the combination of the transfer through the optical fibers and propagation through space.

In the above embodiment, a plurality of wavelength multiplex laser diodes or light-emitting diodes are used as light sources, and emission light wavelengths slightly different from one another, from these light sources, are multiplexed. With the present techniques, however, it is possible to realize a multi-channel system having ten channels at the most by using such laser diodes or light-emitting diodes. For realizing a system having a greater number of channels, it is effective to spectroscopically separate light from a white light source or use lasers capable of wavelength tuning.

Further, while the above embodiment has concerned with a temperature measuring system, for measuring the strain in various parts of a rotor, for instance, a multi-channel contact-free strain measuring system can be constructed by using pressure-sensing optical sensors utilizing the modulation of light according to pressure.

Figure 7:
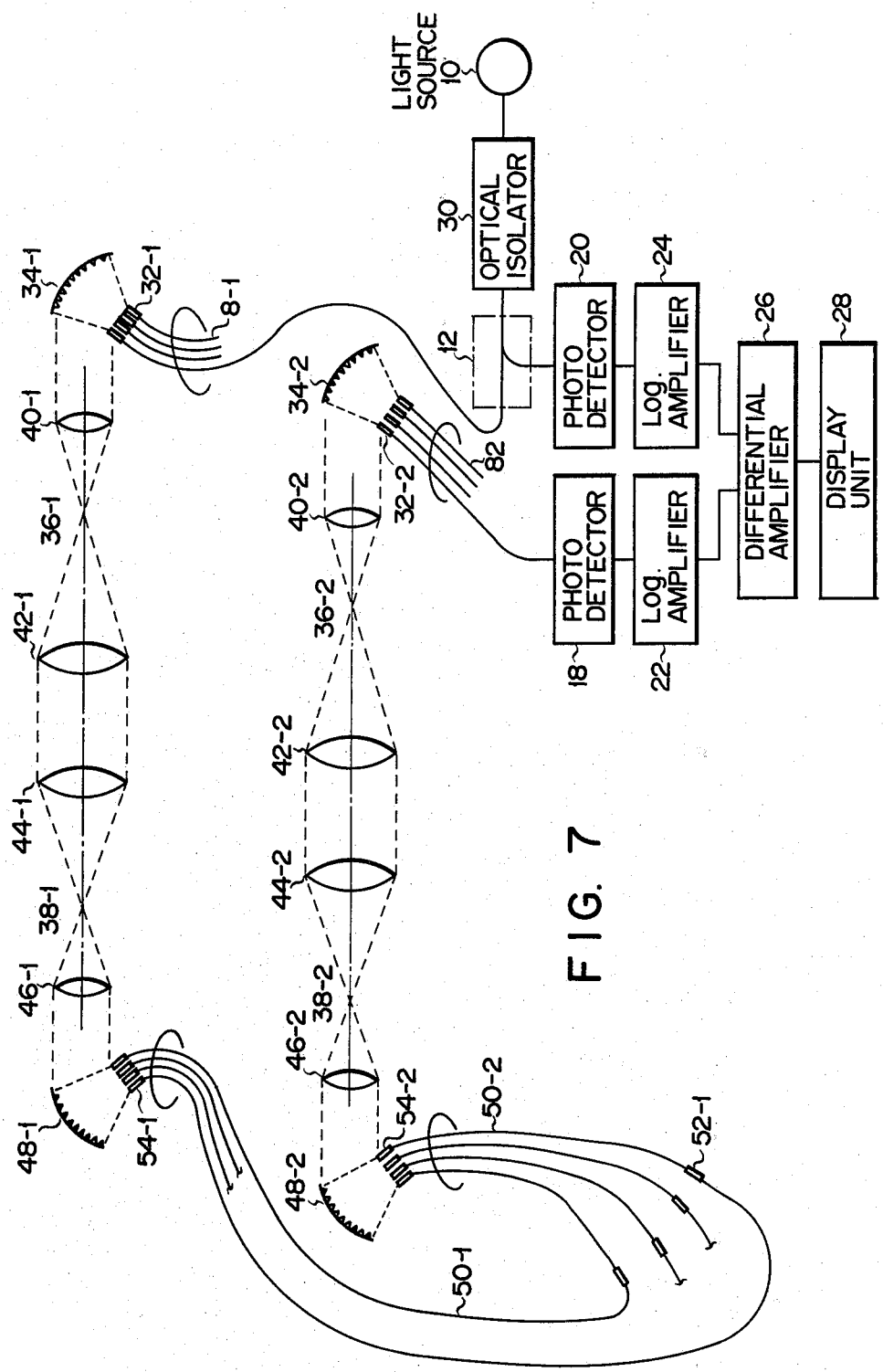
FIG. 7 is a schematic representation of a modification of the embodiment of FIG. 1.

Furthermore, while the optical sensor 52 used in the above embodiment is of the reflection type that is, it light intensity modulates the input or incident light beam and returns the modulation as the output or reflected light beam to the same light path, it is also possible to use a transmission type optical sensor, in which the light path of the incident light beam and that of the transmission light beam are different from each other, as shown in FIG. 6. In the optical sensor 52 shown in FIG. 6, a self-focusing rod lens 62-1, a polarizer 64-1, a double refraction crystal 66, an analyzer 64-2 and a self-focusing rod lens 62-2 are provided in the mentioned order along a light path extending from an input optical fiber 50-1 to an output optical fiber 50-2. With this optical sensor 52, the diverged light beam emerging from the self-focusing rod lens 62-1 is linearly polarized by the polarizer 64-1 and then elliptically polarized by the double refraction crystal 66 according to the temperature. From the elliptically polarized light beam only a component directed along the polarization surface is taken out by the analyzer 64-2 and this light beam is transmitted through the self-focusing rod lens 62-2 to the output optical fiber 50-2. In this way, the input light beam to this optical sensor 52 is light intensity modulated, and the modulated light beam is taken out as input light beam. The output optical fiber 50-2 may be coupled to the input transmission path, or it may be coupled to an optical transmission path in a uni-directional optical system, which has a similar arrangement to that shown in FIG. 1 but is provided separately from the path for the input optical signal. FIG. 7 shows a modification of the embodiment of FIG. 1. Here, the optical sensors are coupled between an optical transmission path for the incident light beam and a separate one for the transmitted light beam. In FIG. 7, like parts in the two optical transmission paths are designated by like reference numerals with a suffix 1 provided for optical elements in the incident light beam optical transmission path and a suffix 2 for those in the transmitted light beam optical transmission path.

As has been described in the foregoing, according to the invention it is possible to provide a multi-channel contact-free sensing system, which measures a physical quantity such as temperature or strain at a plurality of measuring points inside a generator or a motor by an optical and contact-free method and is good reliability.

What is claimed is:

1. An optical sensing system comprising;
   means for producing unmodulated light beams having different wavelengths;
   a plurality of sensors provided at measuring points respectively, the sensors modulating the intensities of said unmodulated light beams in response to physical quantities at the measuring points respectively;
   first multiplexing and demultiplexing means for spectroscopically multiplexing the unmodulated light beams having different wavelengths into unmodulated light and spectroscopically demultiplexing modulated light into modulated light beams having different wavelengths;
   second multiplexing and demultiplexing means for spectroscopically multiplexing the modulated light beams into modulated light and spectroscopically demultiplexing unmodulated light into the unmodulated light beams;
   means for comparing the modulated light beams with the unmodulated light beams generated from said producing means to detect the physical quantities of the measuring points respectively;
   a plurality of first optical waveguides which are optically coupled between said first multiplexing and demultiplexing means and said comparing means, through which said modulated and unmodulated light beams are transferred between said first multiplexing and demultiplexing means and said comparing means;
   means for transferring the modulated light and the unmodulated light through space between said first multiplexing and demultiplexing means and said second multiplexing and demultiplexing means; and
   a plurality of second optical waveguides which are optically coupled between said second multiplexing and demultiplexing means and said plurality of sensors, through which the modulated and unmodulated light beams are transferred between said second multiplexing and demultiplexing means and sensors.

2. An optical sensing system according to claim 1, wherein said first and second multiplexing and demultiplexing means are constituted by the same type of optical unit.

3. An optical sensing system according to claim 2, said optical units each consist of a concave diffraction grating.

4. An optical sensing system according to claim 1, wherein said sensors each include a lens for diverging the unmodulated light beam transferred from the plural second optical waveguides and converging the modulated light beam into the plural second optical waveguides, a polarizer for linearly polarizing the unmodulated light beam and transmitting only a component of the modulated light beam traveling along the polarization surface, a double refraction crystal for converting said linearly polarized light beam into an elliptically polarized light beam according to the temperature of each said measuring point, an optical member for reflecting said elliptically polarized light beam while giving the phase difference thereto, the optical member having a mirror and a quarterwave plate.

5. An optical sensing system according to claim 1, wherein said producing means, said first multiplexing and demultiplexing means, said comparing means, and said first waveguides are provided in a stationary section, said sensors, said second multiplexing and demultiplexing means, and said second optical waveguides are provided in a rotational section, and said transferring means optically connects said stationary section to said rotational section.

6. An optical sensing system comprising;

means for producing unmodulated light beams having different wavelengths;

first multiplexing means for spectroscopically multiplexing the unmodulated light beams into modulated light;

a plurality of first optical waveguides for transferring the unmodulated light beams from said producing means to said first multiplexing means;

first demultiplexing means for spectroscopically demultiplexing the unmodulated light into the unmodulated light beams;

first transferring means for transferring the unmodulated light from said first multiplexing means to said demultiplexing means through space;

a plurality of sensors provided at measuring points respectively, the sensors modulating intensities of the unmodulated light beams with the physical quantities of the measuring points respectively;

a plurality of second optical waveguides for transferring the unmodulated light beams from said first demultiplexing means to said sensors respectively;

second multiplexing means for multiplexing the modulated light beams generated from said sensors into modulated light;

a plurality of third optical waveguides for transferring the modulated light beams from said sensors to said second multiplexing means;

second demultiplexing means for demultiplexing the modulated light into the modulated light beams;

second transferring means for transferring the modulated light from said second multiplexing means to said second demultiplexing means through space;

means for comparing the modulated light beams with the unmodulated light beams generated from said producing means to detect the physical quantities of the measuring points respectively; and a plurality of fourth optical waveguides, for transferring the modulated light beams from said second demultiplexing means to said comparing means.

7. An optical sensing system according to claim 6, wherein said sensors each include a lens for diverging the unmodulated light beam transferred from said second optical waveguide, a polarizer for linearly polarizing the unmodulated light beam, a double refraction crystal for converting the linearly polarized light beam into an elliptically polarized light beam according to the temperature of each said measuring point, an analyzer for transmitting only a component of said elliptically polarized light beam traveling along the polarization surface and a lens for converging the modulated light beam into said fourth optical waveguides.

8. An optical sensing system according to claim 6, wherein said producing means, said first multiplexing means, said first optical waveguides, said second demultiplexing means, said fourth optical waveguides, and said comparing means are provided in a stationary section, said first demultiplexing means, said second potical waveguides, said sensors, said third optical waveguides, and said second multiplexing means are provided in a rotational section, and said first and second transferring means optically connect said stationary section and said rotational section.

* * * * *